Figure 1:
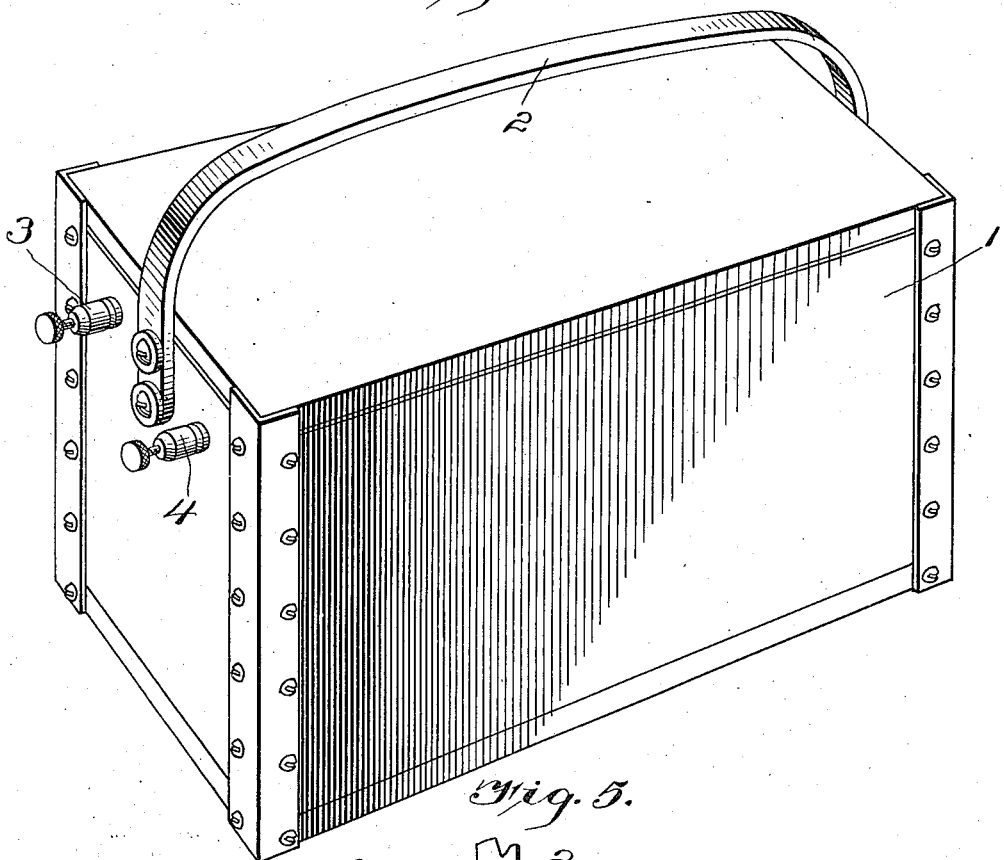

G. N. WATERBURY, Jr.
BATTERY HOLDER.
APPLICATION FILED JAN. 14, 1910.

989,738.

Patented Apr. 18, 1911.

3 SHEETS—SHEET 1.

Witnesses
J. P. Britt
E. C. Duffy

Inventor
George N. Waterbury Jr.
By
Attorneys

G. N. WATERBURY, Jr.
BATTERY HOLDER.
APPLICATION FILED JAN. 14, 1910.

989,738.

Patented Apr. 18, 1911.

3 SHEETS—SHEET 2.

Witnesses
T. P. Britt
E. C. Duffy

Inventor
George N. Waterbury Jr.

By O. C. Duffy
Attorneys

G. N. WATERBURY, Jr.
BATTERY HOLDER.
APPLICATION FILED JAN. 14, 1910.
989,738.
Patented Apr. 18, 1911.
3 SHEETS—SHEET 3.
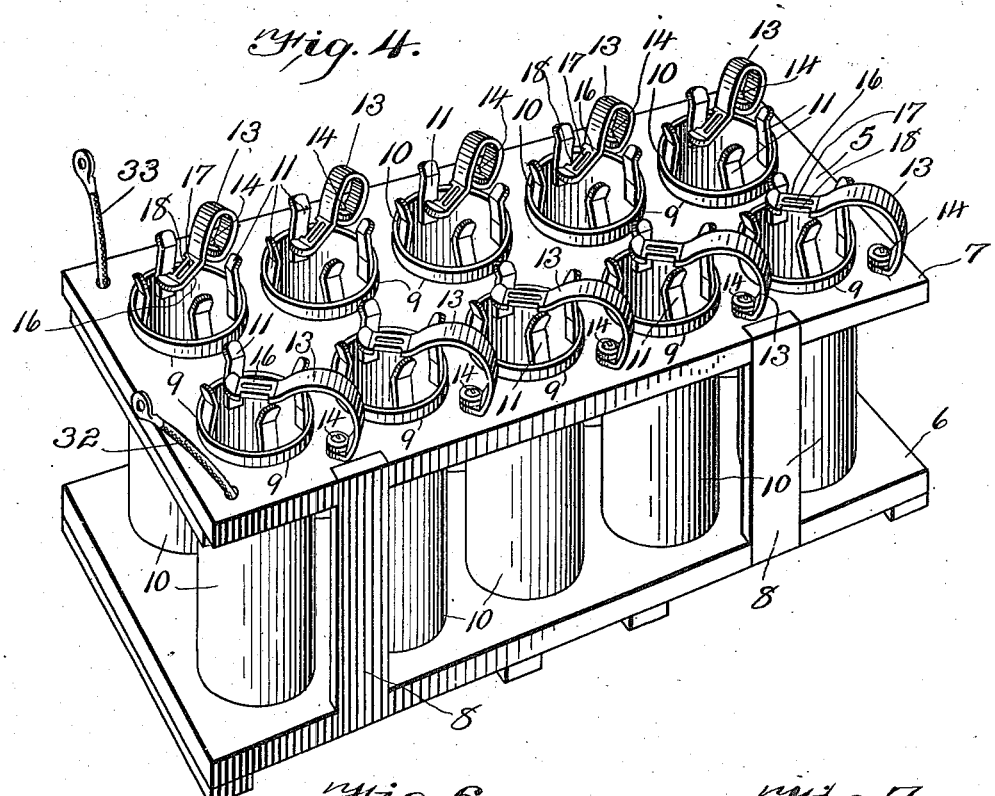
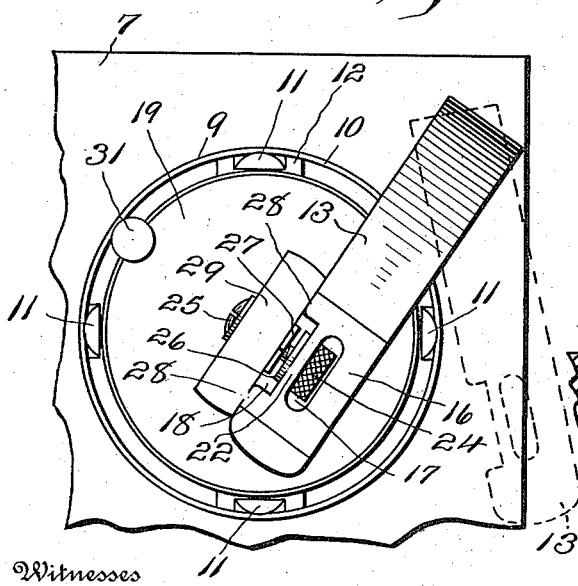
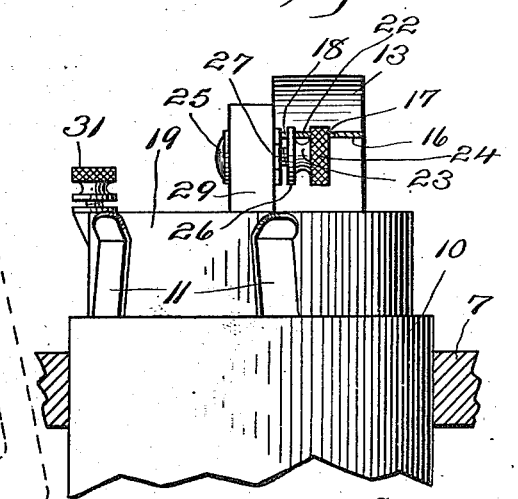
Witnesses
T. P. Britt
E. C. Duffy
Inventor
George N. Waterbury Jr.
By
O. C. Duffy
Attorney

UNITED STATES PATENT OFFICE.

GEORGE NEWCOMB WATERBURY, JR., OF WASHINGTON, DISTRICT OF COLUMBIA.

BATTERY-HOLDER.

989,738.  Specification of Letters Patent.  Patented Apr. 18, 1911.

Application filed January 14, 1910. Serial No. 538,039.

*To all whom it may concern:*

Be it known that I, GEORGE N. WATERBURY, Jr., a citizen of the United States, residing at Washington, in the District of Columbia, have invented certain new and useful Improvements in Battery-Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a cage or holder for dry cell electric batteries, and has for its object to provide a holder which is particularly designed for automobile or motor boat use, although as will be clearly evident the same can be advantageously employed in any capacity requiring the use of a series of electric dry cells.

A further object of my invention is to provide a cage for the reception of a series of electric dry cells which can be conveniently placed in a box, case or other receptacle during service or for transportation.

A further object of my invention is to provide a battery cage wherein the cells can be connected in series without the use of wire on the binding posts of the cells.

A further object of my invention is to provide a battery cage which will accommodate any electric dry cell of standard size, and which does not require any special form of dry cell.

A further object of my invention is to provide a battery cage in which the battery connectors are so constructed and arranged that they will conform to any style of binding posts now employed on electric dry cells.

A further object of my invention is to provide a battery cage in which the cells can be instantly inserted and connected or disconnected and removed without the use of tools implements or appliances and without connecting or disconnecting any wires or handling the binding posts on the cells.

A further object of my invention is to provide a battery cage which can be quickly and easily inspected while the cells are in service in such manner that any disconnection or break in the circuit can be readily ascertained.

With these objects in view my invention consists in the novel construction of the battery cage; and my invention also consists in the novel construction of the spring battery connectors.

Figure 5:
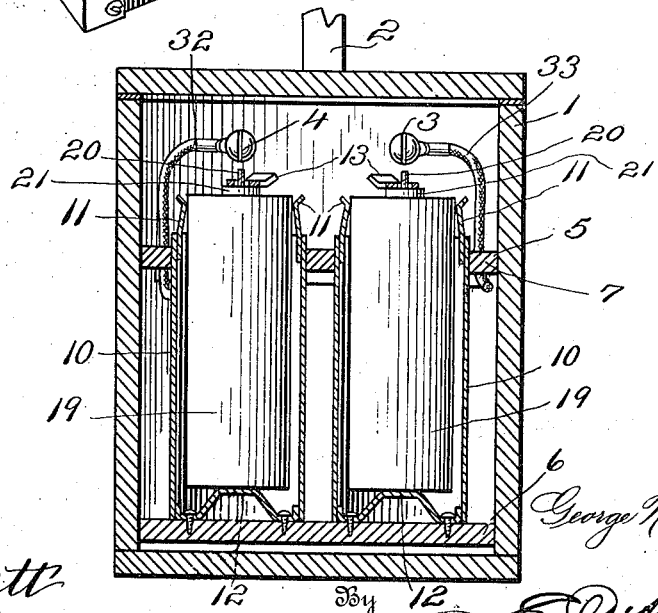
Figure 2:
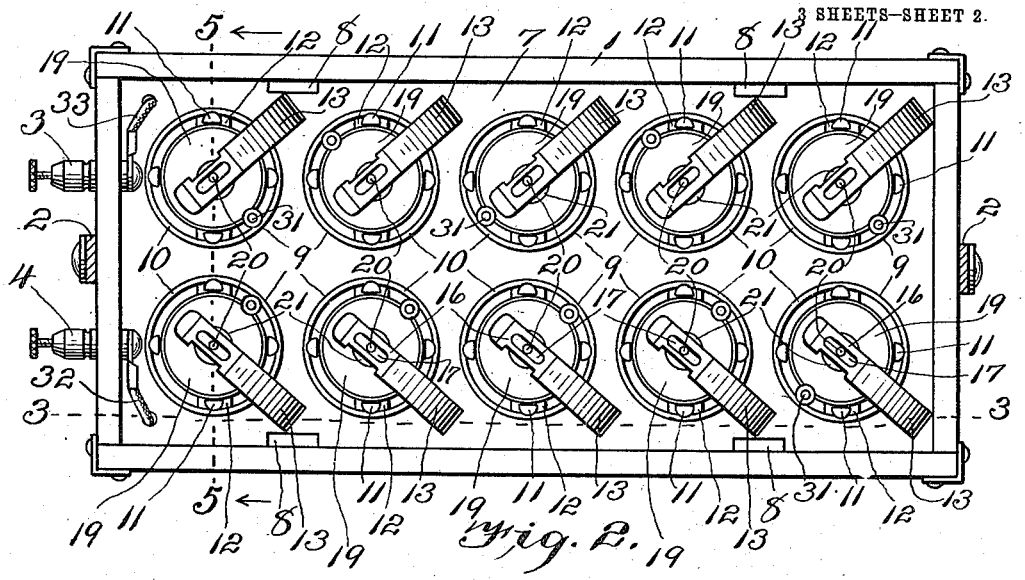
Figure 3:
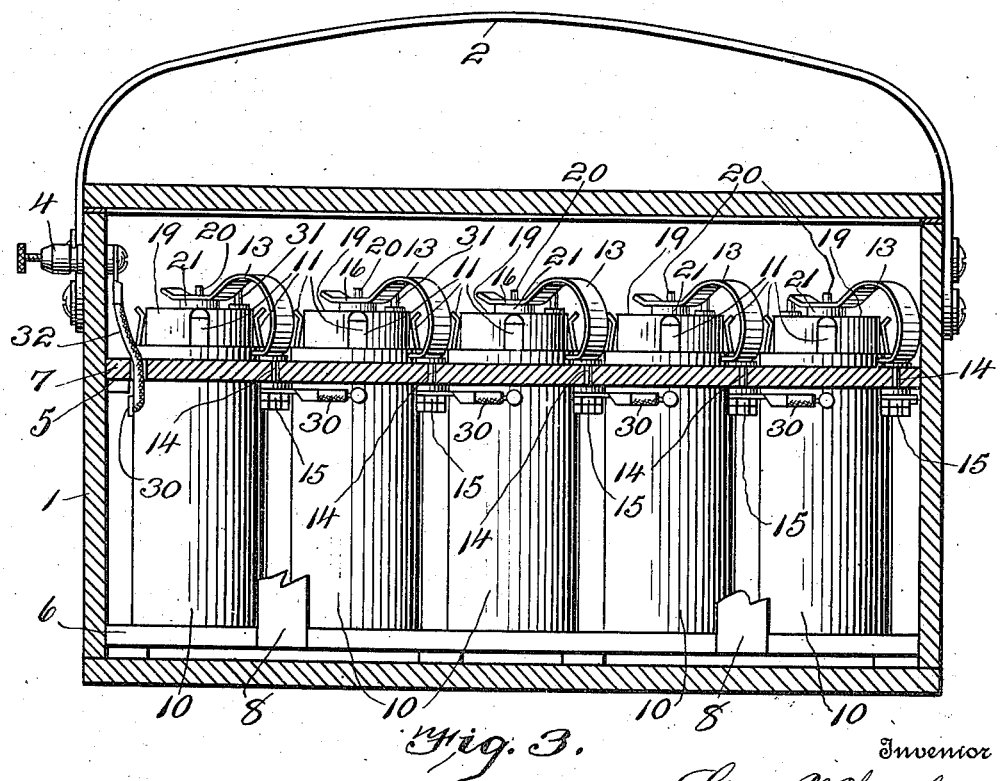

Referring to the accompanying drawings, Figure 1 is a perspective view of the battery box or holder within which the battery cage is placed. Fig. 2 is a plan view of the battery cage within the box or holder. Fig. 3 is a longitudinal sectional view through the box or holder and battery cage taken on line 3—3 of Fig. 2, the spring connectors being shown in perspection. Fig. 4 is a perspective view of the battery cage. Fig. 5 is a transverse sectional view through the box or holder and battery cage taken on line 5—5 of Fig. 2. Fig. 6 is an enlarged plan view of one holder of the battery cage showing battery cell and spring connector, and Fig. 7 is an elevation of the same showing spring connector in transverse section.

Like numerals of reference indicate the same parts throughout the several figures in which:

1 indicates the box or holder which may be of any convenient size, and preferably provided with a carrying strap 2.

3 and 4 indicate the binding posts arranged in one end of the box or holder 1.

5 indicates the battery cage which comprises the base 6 and the top 7, said base and top being connected together as shown in Fig. 4 by means of the uprights 8 in such manner as to form a light but strong and rigid structure. As will appear from the drawings the top 7 of the cage 5 is provided with a series of circular openings 9 and in each opening is placed a cylindrical cell holder 10, said holders being constructed of metal of good electrical conductivity.

Arranged in the top of each of the cell holders 10 is a series of spring fingers 11, the outer ends of said fingers being bent outwardly as shown to allow the same to readily receive a battery call. At the bottom of each cell holder 10, as will appear from Fig. 5, a metallic strap 12 is provided, said strap being connected to the sides of the cell holder and having its central portion slightly raised as shown in order to form a support for the battery cell.

13 indicates the spring connectors which as shown in Fig. 4 are arranged on the top 7 of the cage 5; and as will appear from Fig. 3 said connectors are secured in position by means of bolts 14 passing through the top 7 and held firmly in position by means of the nuts 15. This construction allows each of the spring connectors 13 to be swung into position shown in dotted lines in Fig. 6 in order to provide for a ready insertion or removal of the cells from the cell holders. As will appear from Fig. 6 and also from Fig. 4 each of the spring connectors 13 is provided with a substantially flat portion 16 near the outer or free end of the connector, and disposed in said flat portion 16 is a longitudinal slot 17, while a recess 18 of substantially the same length as the slot 17 is provided in one edge of the substantially flat portion 16 of each spring connector.

19 indicates the dry battery cells, and as the binding posts of the standard dry battery cells are of two distinct styles I have illustrated the application of the spring connectors 13 to both styles of binding posts. In Figs. 2, 3 and 5 I have illustrated the battery cells having the central positive binding post extending vertically from the center of the cell; while in Figs. 6 and 7 I have illustrated the other type of cell in which the carbon extends vertically through the top of the cell and the positive binding post extends horizontally from the said carbon. As both forms of cells are now in universal use I have constructed the spring connectors 13 in such manner that they will accommodate themselves equally as well to one form of binding post as to the other as will be now fully described.

In Figs. 2, 3 and 5 in which the cells are shown having the positive binding post arranged vertically it will be seen that after the cells are in position within the cell holders 10 the spring connectors 13 are swung on their pivots into the position as shown, and the spring connectors 13 are caused to engage the central or positive binding posts by placing the same in such position that the said central posts extend through the longitudinal slots 17 in the spring connectors 13. As the position of these binding posts are not uniform in any dry cell batteries, and in many instances are found to be eccentric, I have arranged the slots 17 of considerable length in such manner as to conform to any irregularity in the position of the said central binding posts. As the tension of the spring connectors 13 is downward and at the same time horizontal owing to the friction between the spring connectors and their securing bolts 14 the said spring connectors engage both the threaded binding posts 20 of the cells and the metallic flange 21 from which each binding post 20 extends; consequently a good tight electrical connection is effected between each binding post 20 and its spring connector 13.

When the cell employed is of the type shown in Figs. 6 and 7 each spring connector 13 is swung on its pivot into position shown in Fig. 6, and a thin strip of metal 22 of the spring connector 13 which lies between the longitudinal slot 17 and the recess 18 enters the annular groove 23 in the knurled nut 24 of the binding post 25. When the spring connector 13 lies in this position the base 26 of the knurled nut 24 and the small lock nut 27 of the binding post enters the recess 18 in the spring connector 13 so that the inner edge 28 on each side of the recess 18 rests snugly against the side of the carbon 29 in such manner that all tendency of the cell to rotate is entirely eliminated and the cell is held firmly in proper position by the connector 13. By reason of this construction the tendency for accidental displacement of the spring connector is almost entirely eliminated. Were it not, however, for the recessed form of the spring connector 13 the cell would have a tendency to rotate and thus work the connector out of contact with the knurled binding post 24.

As will appear from Fig. 3 each of the metallic cell holders 10 is provided with a connector 30 which is securely connected thereto in any approved manner, said connector passing from its metallic cell holder to the bolt 15 of the next spring connector 13 causing the dry cells to be connected in series as will be now fully described. Before placing the dry cells within the metallic cell holder 10 the usual paper covers are removed from the cells and the upper portions of the zinc exterior as well as the bottoms of the cells are rubbed slightly with an abrasive material such as sand paper or the like for the purpose of removing the usual thin coating which is universally applied to the zinc exterior of all dry cells. When this coating has been removed from the upper portion and from the bottom of the cells they are inserted in the metallic cell holders 10 and are engaged by the spring fingers 11 in the tops of each metallic cell holder 10 as these spring fingers 11 are connected to the cell holders 10 in any approved manner, as for instance by riveting or soldering a tight electrical connection is effected between the zinc exterior of each cell and the metallic cell holder 10. In order, however, to further provide for a good electrical connection between the zinc exterior of the cells and the metallic cell holders 10 the metallic strap 12 is provided at the bottom of each cell holder upon which the cells rest and as the tendency of the spring connectors 13 is to force the cells downwardly a good electrical connection is effected between the bottom of each cell and its metallic cell holder through the medium of the metallic strap 12. With this construction of wiring the connectors for the negative binding posts 31 are eliminated as the connection is made directly with the zinc exterior of the cell; consequently as the zinc exterior of each cell is connected to the positive binding post of the next cell by means of the connectors 30 and the spring connectors 13 the batteries are connected in series.

From the metallic cell holders 10 I arrange a wire connector 32 which is connected to the negative binding post 4 of the battery box or holder 1, and from the spring connectors 13 I provide a wire connector 33 which passes to the positive binding post 3 of the battery box or holder.

It is of course evident from the foregoing description taken in connection with the accompanying drawings that the cells may or may not be connected in series-multiple; and it is also clearly evident that the cage may be made to accommodate any desired number. These points are entirely immaterial and I of course lay no claim to the same, but What I do claim, however, as my invention and desire to secure by Letters Patent of the United States is:—

1. The combination of a cell holder for a dry cell electric battery and an electrical spring contact disposed adjacent thereto for contact with a terminal of a dry cell, means for effecting an electrical connection between the cell holder and a cell contained therein, said electrical contact being pivoted at one end in such manner as to swing horizontally over the cell holder and to have a spring tendency in a horizontal direction and a spring tendency in a vertical direction.

2. The combination of a cell holder for a dry cell electric battery and an electrical spring contact disposed adjacent thereto for effecting an electrical contact with the positive terminal of a dry cell electric battery, means on said spring contact for engaging either a vertical positive terminal or a horizontal positive terminal of an electric dry cell.

3. A cage or holder for dry cell electric batteries comprising a plurality of cell holders of electrical conducting material, and a suitable structure for supporting the same in proper relative position, a suitable electrical contact in each cell holder for electrical contact with the zinc of each dry cell, a spring contact pivoted on the supporting structure adjacent each cell holder for contact with the carbon of each dry cell, an electrical connection between each cell holder and an adjacent spring contact on the supporting structure, the free cell-engaging end of each spring contact on the supporting structure being provided with a longitudinal slot for engagement with a vertical or horizontal terminal of a dry cell, and provided with a recess in one edge to prevent rotation of a cell provided with a horizontal terminal.

4. The combination of a cell holder for a dry cell electric battery and an electrical spring contact pivoted adjacent the cell holder, means for effecting an electrical connection between the cell holder and the negative pole of a dry cell electric battery, said pivoted spring contact being provided at its free or contact end with a longitudinal slot for engagement with a vertical positive terminal of a dry cell, or for engagement with a horizontal positive terminal of a dry cell, the said end of said spring contact being provided with means for preventing the rotation of a dry cell provided with a horizontal positive terminal.

5. The combination of a cell holder for a dry cell electric battery and an electrical spring contact pivoted adjacent the cell holder and movable on its pivot horizontally over the cell holder, said contact being pivoted in such manner that the free end of the contact exerts a pressure downwardly in a vertical direction and simultaneously exerts a pressure in a horizontal direction.

In testimony whereof, I affix my signature, in presence of two witnesses.

GEORGE NEWCOMB WATERBURY, Jr.

Witnesses:
M. STRASSMAN,
STEPHEN WHITEHOUSE.